United States Patent
Iwamoto

(10) Patent No.: US 7,596,945 B2
(45) Date of Patent: Oct. 6, 2009

(54) LOAD CONTROL DEVICE FOR ENGINE OF WORK VEHICLE

(75) Inventor: Yuuichi Iwamoto, Ishikawa (JP)

(73) Assignee: Komatsu Ltd., Tokyo, Minato-Ku (JP)

( * ) Notice: Subject to any disclaimer, the term of this patent is extended or adjusted under 35 U.S.C. 154(b) by 321 days.

(21) Appl. No.: 11/659,782

(22) PCT Filed: Aug. 11, 2005

(86) PCT No.: PCT/JP2005/014759

§ 371 (c)(1),
(2), (4) Date: Feb. 8, 2007

(87) PCT Pub. No.: WO2006/016653

PCT Pub. Date: Feb. 16, 2006

(65) Prior Publication Data

US 2007/0193262 A1 Aug. 23, 2007

(30) Foreign Application Priority Data

Aug. 11, 2004 (JP) ............................. 2004-234646

(51) Int. Cl.
*F16D 31/02* (2006.01)
(52) U.S. Cl. ...................................................... 60/431
(58) Field of Classification Search ................ 60/431
See application file for complete search history.

(56) References Cited

U.S. PATENT DOCUMENTS 4,697,418 A 10/1987 Okabe et al.

2004/0098984 A1 * 5/2004 Duell et al. .................. 60/431

FOREIGN PATENT DOCUMENTS

| JP | 58-5338 | 1/1983 |
|----|---------|--------|
| JP | 62-058033 | 3/1987 |
| JP | 03-267534 | 11/1991 |
| JP | 04-027784 | 1/1992 |
| JP | 09-316937 | 12/1997 |
| JP | 2003-184805 | 7/2003 |
| KR | 49736 | 11/1991 |
| KR | 20030051244 | 6/2003 |

* cited by examiner

*Primary Examiner*—F. Daniel Lopez
(74) *Attorney, Agent, or Firm*—Husch Blackwell Sanders LLP Welsh & Katz

(57) ABSTRACT

A load control device for an engine of a work vehicle that purposes to render the work vehicle, such as a wheel loader or the like, capable of raising a vehicle speed in a short period of time by providing a sufficient traction force when a high traveling load is imposed, without causing degradation of a vehicle body performance, waste of energy, and other problems. The load control device is provided with variable displacement hydraulic pumps (7, 8, 9) being provided with absorption torque changing means (19, 22) for changing absorption torque. A controller (18) determines whether a traveling load is in a high state, and when it has been determined that the traveling load is in the high state, control for lowering the absorption torque for the hydraulic pumps (7, 8, 9) is carried out. This control is carried out, provided, for example, that a "power mode" is selected with the power mode switch (31). The determination that the traveling load is in the high state can be made by determining that the wheel loader (100) is in an acceleration state.

1 Claim, 5 Drawing Sheets

LOAD CONTROL DEVICE FOR ENGINE OF WORK VEHICLE

TECHNICAL FIELD

The present invention relates to a load control device for an engine of a work vehicle.

BACKGROUND ART

A wheel loader is run by drive wheels being driven from an engine as a driving source through a torque converter. In other words, an engine output is used for a traveling load. In addition, the engine also provides a driving source for a steering mechanism, and a work machine such as a loader or the like. In other words, the engine drives a steering hydraulic pump; a pressurized oil delivered from the steering hydraulic pump is supplied to a steering hydraulic cylinder; and according to this, the steering mechanism is operated. In addition, the engine also drives a loader hydraulic pump; pressurized oil delivered from the loader hydraulic pump is supplied to a loader hydraulic cylinder; and according to this, a loader is operated. For the steering hydraulic pump and the loader hydraulic pump, a fixed displacement hydraulic pump, which is fixed in displacement, is used. Thus, the engine output is used not only for the traveling load, but also for the working hydraulic pressure load.

Running speed of the wheel loader varies depending upon the amount of pedal depression for an accelerator pedal. In other words, according to the amount of pedal depression for the accelerator pedal, revolutions for the engine is changed, and according to that, the vehicle speed is changed.

And, the wheel loader encounters many opportunities to carry out working in the situation in which both the traveling load and the working hydraulic pressure load are imposed, for example, in the situation in which the loader is vertically moved while the wheel loader is being run, as compared to the other types of work vehicles, such as the hydraulic excavator, and the like.

Herein, for the hydraulic excavator, the invention with which the maximum absorption torque or the displacement for the variable displacement hydraulic pump is changed according to the various working modes has already become well-known on the various patent literature as exemplified below.

Patent literature 1: Japanese Patent Application Laid-Open No. 62-58033

Patent literature 2: Japanese Patent Publication No. 2711833

DISCLOSURE OF THE INVENTION

Problems to be Solved by the Invention

Thus, with the wheel loader, a single engine output is used for both the traveling load and the working hydraulic pressure load. Therefore, the engine output which can be used for running depends upon the magnitude of the working hydraulic pressure load.

FIG. 3 illustrates the relationship between the engine revolutions N and the engine torque Te. In FIG. 3, the torque converter matching curve $L_t$ provides the absorption torque line for the torque converter, representing the traveling load. As shown in the arrow A, as the accelerator pedal is depressed, the engine revolutions N and the engine torque Te are raised. In the situation in which the loader or the steering mechanism is not operated, in other words, in the state in which no working hydraulic pressure load is imposed, the torque converter absorption horsepower matches with the engine output at the matching point $V_1$ on the maximum torque line $R_1$, and all the engine output can be used for the traveling load. Thus, when a large traction force is required, or acceleration is needed at a slope, a sufficient traction force can be obtained, which allows the vehicle speed to be raised in a short period of time.

However, in the situation in which the loader or the steering mechanism is operated while the wheel loader is being run, in other words, in the situation in which a working hydraulic pressure load is generated, the engine output as shown with a shaded area in the same FIG. 3 is used as the working hydraulic pressure load, thus only the engine output less it can be used for the traveling load.

Therefore, the matching point for the torque converter absorption horsepower and the engine output is lowered to $V_2$, the engine output which can be used for running being lowered, thus, in the situation in which a high traveling load must be dealt with, while the working is being carried out, the engine output required for the high traveling load cannot be obtained, which may result in a sufficient traction force being unable to be obtained or the vehicle speed being unable to be raised even in a long period of time.

Then, in order to solve such a problem, it can be considered to reduce the torque itself which is absorbed in the work machine hydraulic pump, in other words, to set the displacement for the fixed displacement hydraulic pump, such as the steering hydraulic pump, or the like, at a small value. However, setting the displacement for the steering hydraulic pump at a small value presents a problem that, at the time of low idle, when the engine revolutions is low, the steering cannot be sufficiently turned. With the wheel loader, it is required that the steering be able to be sufficiently turned even when the engine is in the low idling state (at the time of low idle running). In order to cause the pressurized oil to flow at a high rate into the steering hydraulic cylinder even at the time of low idle running, when the engine revolutions is low, it is required that the displacement for the pump be at a certain level or higher. If the pump displacement is decreased, there arises a problem that the maximum rate of flow which can be supplied to the hydraulic cylinder at the low idle running, when the engine revolutions is low, is reduced, resulting in the speed at which the steering is turned is slowed down. In addition, if the displacement for the loader hydraulic pump is set at a lower value, the flow rate is decreased in the same manner, resulting in the speed at which the loader is vertically moved being slowed down, which lowers the working efficiency. Thus, reducing the displacement for the fixed displacement hydraulic pump leads to degradation of the vehicle body performance.

Naturally, it can be considered that, in order to deal with a high traveling load, the engine is rendered large-sized to provide a margin for the engine torque, however, it is only for an insignificant period of time among the actual working period of time that there occurs a "situation in which a large traction force is required, while the working is being carried out, or an acceleration is needed at a slope", and rendering the engine large-sized only for that insignificant period of time not only causes a rise in cost, but also renders the fuel consumption worse, resulting in waste of energy.

In addition, it can be considered that, when the running and the working are simultaneously carried out, the loader operation lever is maneuvered so as to increase the part of the engine output that can be used for the traveling load, however, the need for performing such a skillful operation would impose a great load on the operator, and actually it is difficult to provide such a maneuver.

The present invention has been made in view of such a situation, and the problem to be solved by the present invention is to render the work vehicle, such as the wheel loader, or the like, capable of providing a sufficient traction force and raising the vehicle speed in a short period of time, when a high traveling load is imposed, without causing degradation of the vehicle body performance, waste of energy, and other problems.

In the above-mentioned patent literatures 1 and 2, it is stated that, according to the various working modes, the maximum absorption torque or the displacement for the variable displacement hydraulic pump is changed, but, the technical concept of changing the distribution of the engine output to the traveling load and the work load according to the various modes, in other words, the concept of dividing a plurality of variable displacement hydraulic pumps into hydraulic pump for running and that for working, and according to the various modes, the magnitude of the maximum absorption torque or the magnitude of the displacement is varied for the running hydraulic pump and the working hydraulic pump is not at all given.

Means to Solve the Problems

A first invention provides a load control device for an engine of a work vehicle in which an output of the engine (1) is transmitted to a drive wheel (5), and the output of the engine (1) is transmitted to a work machine through a variable displacement hydraulic pump (7, 8, 9), comprising: absorption torque changing means (19, 22) for changing absorption torque for the variable displacement hydraulic pump (7, 8, 9); traveling load state determination means (18) for determining whether a traveling load is in a high state; and control means (18) for, when it is determined by the traveling load state determination means (18) that the traveling load is in the high state, lowering the absorption torque for the variable displacement hydraulic pump (7, 8, 9).

A second invention provides a load control device for an engine of a work vehicle in which an output of the engine (1) is transmitted to a drive wheel (5), and the output of the engine (1) is transmitted to a work machine through a variable displacement hydraulic pump (7, 8, 9), comprising: absorption torque changing means (19, 22) for changing absorption torque for the variable displacement hydraulic pump (7, 8, 9); acceleration state determination means (18) for determining whether the work vehicle is in an acceleration state; and control means (18) for, when it is determined by the acceleration state determination means (18) that the work vehicle is in the acceleration state, lowering the absorption torque for the variable displacement hydraulic pump (7, 8, 9).

A third invention is the load control device of the second invention, wherein the acceleration state determination means (18) comprises: acceleration detection means for detecting acceleration of the work vehicle; and determination means for determining whether the acceleration of the work vehicle detected by the acceleration detection means is a prescribed threshold value or over.

A fourth invention is the load control device of the second invention, wherein the acceleration state determination means (18) comprises: operation amount detection means (17a) for detecting an amount of operation of a running operation element (17); and means for determining whether the amount of the operation of the running operation element (17) detected by the operation amount detection means (17a) is a prescribed threshold value or over.

A fifth invention is the load control device of second invention, wherein the acceleration state determination means (18) comprises: revolutions difference computing means for computing a difference between a target revolution for the engine (1) and an actual engine revolution; and means for determining whether the revolution difference computed by the revolution difference computing means is a prescribed threshold value or over.

A sixth invention provides a load control device for an engine of a work vehicle in which an output of an engine (1) is transmitted to a drive wheel (5), and the output of the engine (1) is transmitted to a work machine through a variable displacement hydraulic pump (7, 8, 9), comprising: absorption torque changing means (19, 22) for changing absorption torque for the variable displacement hydraulic pump (7, 8, 9); traveling load measuring means (18) for measuring a traveling load transmitted to the drive wheel (5); and control means (18) for, when the traveling load measured by the traveling load measuring means is a prescribed threshold value or over, lowering the absorption torque for the variable displacement hydraulic pump (7, 8, 9).

A seventh invention is the load control device of the sixth invention, wherein the output of the engine (1) is transmitted to the drive wheel (5) through a torque converter (2) and a transmission (3), and the traveling load measuring means (18) computes the traveling load on the basis of an input shaft revolution of the torque converter (2), an output shaft revolution of the transmission (3), and a speed stage that is currently selected in the transmission (3).

An eighth invention is the load control device of any one of the first invention to the seventh invention, comprising: deceleration state detection means for detecting whether the work vehicle is in a deceleration state; and canceling means (18) for, when it is detected by the deceleration state detection means that the work vehicle is in the deceleration state, canceling the control of lowering the absorption torque for the variable displacement hydraulic pump.

A ninth invention is the load control device of any one of the first invention to the seventh invention, further comprising selection means (31) for selecting a power mode for running with a high traveling load, wherein the control means (18) provides the power mode having been selected by the selection means (31) as a requirement for carrying out control for lowering the absorption torque for the variable displacement hydraulic pump (7, 8, 9).

A tenth invention is the load control device of any one of the third invention to the sixth invention, further comprising running mode selection means (31) for selecting from a plurality of running modes, wherein the threshold value is changed into a magnitude corresponding to a selected work mode in accordance with a type of running mode selected by the running mode selection means (31).

An eleventh invention provides a load control device for an engine of a work vehicle in which an output of the engine (1) is transmitted to a drive wheel (5), and the output of the engine (1) is transmitted to a work machine through a variable displacement hydraulic pump (7, 8, 9), comprising: absorption torque changing means (19, 22) for changing absorption torque for the variable displacement hydraulic pump (7, 8, 9); running mode selection means (31) for selecting from a plurality of running modes; control means for changing a magnitude of the absorption torque for the variable displacement hydraulic pump (7, 8, 9) in accordance with a type of the running mode selected by the running mode selection means (31).

A twelfth invention provides a load control device for an engine of a work vehicle in which an output of the engine (1) is transmitted to a drive wheel (5) through a running hydraulic pump, and the output of the engine (1) is transmitted to a work machine through a work machine variable displacement hydraulic pump (7, 8, 9), comprising: absorption torque changing means (19, 22) for changing absorption torque for the work machine variable displacement hydraulic pump (7, 8, 9); traveling load state determination means (18) for determining whether a traveling load is in a high state; and control means (18) for, when it has been determined by the traveling load state determination means (18) that the traveling load is in the high state, lowering the absorption torque for the work machine variable displacement hydraulic pump (7, 8, 9).

The function and effects of the present invention will be described with reference to the drawings.

As shown in FIG. 6 or FIG. 7A or FIG. 7B, the variable displacement hydraulic pumps 7, 8, 9 are provided with absorption torque changing means 19 or 22 for changing the absorption torque. With the controller 18, whether the traveling load is in the high state is determined, and when it has been determined that the traveling load is in the high state, the control for lowering the absorption torque for the variable displacement hydraulic pumps 7, 8, 9 is carried out. This control is carried out, provided, for example, that the "power mode" is selected with the power mode switch 31 (the ninth invention).

In FIG. 2, the torque converter matching curve $L_t$ provides the absorption torque line for the torque converter 2, representing the traveling load. As shown in the arrow A, as the accelerator pedal 17 is depressed, the engine revolutions N and the engine torque Te are raised, the torque converter absorption horsepower being raised.

The torque converter absorption horsepower is obtained by subtracting the pump absorption horsepower for the variable displacement hydraulic pumps 7, 8, 9 from the engine output. When the working hydraulic pressure load is increased, the traveling load is decreased in relation thereto, the traction force and the acceleration being reduced.

When it has been determined that the traveling load is in the low state, the torque on the torque line $R_2$ as a result of subtracting the working hydraulic pressure load from the maximum torque line $R_1$ in the same FIG. 2 is used for the traveling load. The matching point for the torque converter absorption horsepower and the engine output is provided as the $V_2$ point on the torque line $R_2$.

When it has been determined that the traveling load is in the high state, the absorption torque for the variable displacement hydraulic pumps 7, 8, 9 is changed into a lower value. Thereby, the working hydraulic pressure load is decreased, the torque on the torque line $R_3$ as a result of subtracting the decreased working hydraulic pressure load from the maximum torque line $R_1$ in the same FIG. 2 is used for the traveling load. The matching point for the torque converter absorption horsepower and the engine output is provided as the $V_3$ point on the torque line $R_3$.

Thus, when it has been determined that the traveling load is in the high state, the matching point is moved from $V_2$ to the point $V_3$ where the torque converter absorption horsepower is great as compared to that when the traveling load is not in the high state, whereby, when a high load is imposed during the running while the working is being carried out, for example, when a large traction force is required, or an acceleration is needed at a slope, the traction force can be obtained, which allows the vehicle speed to be raised in a short period of time.

In other words, conventionally, as shown in FIG. 3, even when the traveling load is high, the engine output as shown with a shaded area in the same FIG. 3 is uniformly distributed to the working hydraulic pressure load in the same manner as when the traveling load is low, resulting in the engine output which can be used for the traveling load is low (the matching point is at $V_2$), thus, when a high load is imposed during the running while the working is being carried out, for example, when a large traction force is required, or an acceleration is needed at a slope, a sufficient traction force could not have been obtained, or even in a long period of time, the vehicle speed could not have been raised, however, according to the present example, as shown in FIG. 2, when the traveling load is high, a lower engine output as shown with a shaded area in the same FIG. 2 is distributed to the working hydraulic pressure load, whereby the engine output which can be used for the traveling load is increased in relation thereto (the matching point is at $V_3$), thus when a high load is imposed during the running while the working is being carried out, for example, when a large traction force is required, or an acceleration is needed at a slope, a high traction force can be obtained, which allows the vehicle speed to be raised in a short period of time, as compared to the conventional art.

In the state in which the loader or the steering mechanism is not operated, in other words, in the state in which no working hydraulic pressure load is imposed, and the traveling load is high, the torque converter absorption horsepower matches with the engine output at the matching point $V_1$ on the maximum torque line $R_1$, and all the engine output can be used for the traveling load. Thus, when a large traction force is required, or acceleration is needed at a slope, a sufficient traction force can be obtained, which allows the vehicle speed to be raised in a short period of time.

As described above, according to the present invention, when a high traveling load is imposed, a sufficient traction force is obtained, which allows the vehicle speed to be raised in a short period of time. Yet, the displacement for the fixed displacement hydraulic pump is not set at a uniform low value, but the displacement or the maximum absorption torque for the variable displacement hydraulic pump is only temporarily lowered when the traveling load is in the high state, thus degradation of the performance of the vehicle body is not caused. Yet, there is no need for rendering the engine large-sized in order to increase the engine output, which eliminates the problems of an increase in fuel consumption and waste of energy.

The determination that the traveling load is in the high state can be carried out by determining that the wheel loader 100 is in the accelerated state (the second invention).

Specifically, it is determined by the controller 18 whether the acceleration of the vehicle body is a prescribed threshold value or higher, and when the acceleration of the vehicle body has been determined to be the prescribed threshold value or over, the absorption torque for the hydraulic pumps 7, 8, 9 is decreased, and the torque converter absorption torque is increased in relation thereto (the third invention).

In addition, it is determined by the controller 18 whether the amount of pedal depression is a prescribed threshold value or higher for the accelerator pedal 17, and when the amount of pedal depression for the accelerator pedal 17 has been determined to be the prescribed threshold value or over, the absorption torque for the hydraulic pumps 7, 8, 9 may be decreased with the torque converter absorption torque being increased in relation thereto (the fourth invention).

In addition, the difference between the target revolutions for the engine 1 and the actual engine revolutions Nr is computed, and whether this difference in revolutions is a prescribed threshold value or higher is determined by the controller 18, and when it has been determined that the revolutions difference is the prescribed threshold value or over, the absorption torque for the hydraulic pumps 7, 8, 9 may be decreased with the torque converter absorption torque being increased in relation thereto (the fifth invention).

The determination that the traveling load is in the high state can be carried out by actually measuring the traveling load transmitted to the drive wheels 5, and determining that the measured traveling load is a prescribed threshold value or over (the sixth invention).

Specifically, the traveling load is computed on the basis of the torque converter input shaft revolutions N1, the transmission output shaft revolutions N2, and the speed stage currently selected in the transmission 3, and whether this computed traveling load is a prescribed threshold value or over is determined by the controller 18, and when it has been determined that the computed traveling load is the prescribed threshold value or over, the absorption torque for the hydraulic pumps 7, 8, 9 may be decreased with the torque converter absorption torque being increased in relation thereto (the seventh invention).

In addition, whether the vehicle body is in the deceleration state is determined, and when it has been determined that the vehicle body is in the deceleration state, the control for decreasing the absorption torque for the hydraulic pumps 7, 8, 9 may be canceled. In other words, when it has been determined that the vehicle body is in the deceleration state, the control for lowering the maximum absorption torque for the hydraulic pump in the direction of the arrow D in FIG. 4 may be canceled, or the control for lowering the displacement for the hydraulic pump in the direction of the arrow E in FIG. 5 may be canceled for returning from the matching point $V_3$ in FIG. 2 where the working hydraulic pressure load is lower (the traveling load is higher), to the matching point $V_2$ where the working hydraulic pressure load is higher (the traveling load is lower) (eighth invention).

The above-mentioned respective threshold values may be changed according to the running mode selected. In other words, when the "power mode" is selected, the operator has an intention to run with a high traveling load, the threshold value is set at a low value. For example, by setting the threshold value of the amount of pedal depression for the accelerator pedal 17 at a low value, the control with which, even when the amount of pedal depression for the accelerator pedal is in the small state, the absorption torque for the hydraulic pumps 7, 8, 9 is immediately decreased with the torque converter absorption torque being increased in relation thereto is carried out. Thereby, any high traveling load can be early dealt with. Contrarily, when the "normal mode" is selected, the operator has no intention to run with so high a traveling load, thus the threshold value is set at a high value. For example, by setting the threshold value of the amount of pedal depression for the accelerator pedal 17 at a high value, the control with which, when the accelerator pedal is depressed in a large amount of pedal depression, the absorption torque for the hydraulic pumps 7, 8, 9 is decreased with the torque converter absorption torque being increased in relation thereto is carried out. Thereby, while priority is being given to the working hydraulic pressure load, the traveling load can also be dealt with (the tenth invention).

In addition, simply by performing the switch operation on the control panel 30, the absorption torque for the hydraulic pumps 7, 8, 9 is decreased. In other words, when the "power mode" is selected, the control which lowers the maximum absorption torque for the hydraulic pump in the direction of the arrow D in FIG. 4 is carried out, or the control which lowers the displacement for the hydraulic pump in the direction of the arrow E in FIG. 5 is carried out, for shifting to the matching point $V_3$ in FIG. 2 where the working hydraulic pressure load is lower (the traveling load is higher).

On the other hand, when the "normal mode" is selected, the control for lowering the maximum absorption torque for the hydraulic pump in the direction of the arrow D in FIG. 4 may be canceled, or the control for lowering the displacement for the hydraulic pump in the direction of the arrow E in FIG. 5 may be canceled for returning from the matching point $V_3$ in FIG. 2 where the working hydraulic pressure load is lower (the traveling load is higher), to the matching point $V_2$ where the working hydraulic pressure load is higher (the traveling load is lower) (the eleventh invention).

By the way, depending upon the type of the work vehicle, the output of the engine 1 is transmitted to the drive wheels 5 through the running hydraulic pump and the running hydraulic motor, rather than through the torque converter 2 and the transmission 3. To any work vehicle having such a configuration, the present invention can also be applied (the twelfth invention).

BEST MODE FOR CARRYING OUT THE INVENTION

Hereinbelow, an embodiment of the load control device for engine of work vehicle pertaining to the present invention will be described with reference to the drawings.

FIG. 1 illustrates the configuration of the wheel loader of the embodiment about the portions pertaining to the present invention.

As shown in the same FIG. 1, the output shaft of an engine 1 for a wheel loader 100 is connected to a PTO shaft 6. The PTO shaft 6 is connected to a torque converter 2, and is also connected to a steering hydraulic pump 7, a loader hydraulic pump 8, a fan hydraulic pump 9, and a torque converter lubrication hydraulic pump 10.

The steering hydraulic pump 7, the loader hydraulic pump 8, the fan hydraulic pump 9 are variable displacement hydraulic pumps, and with the tilted angle of a tilting plate 7a, 8a, 9a being changed, the pump displacement q (cc/rev) is changed, respectively.

The output of the engine 1 is transmitted to drive wheels 5 through a torque converter 2, a transmission 3, and a differential gear 4. The transmission 3 essentially consists of a forward-drive hydraulic clutch, a backward-drive hydraulic clutch, speed stage clutches, i.e., a 1st-speed hydraulic clutch, a 2nd-speed hydraulic clutch, a 3rd-speed hydraulic clutch, a 4th-speed hydraulic clutch, and according to the vehicle speed, and the like, either of the forward-drive hydraulic clutch and the backward-drive hydraulic clutch is selected, with some of the speed stage clutches being selected for carrying out the speed change.

In addition, the output of the engine 1 is transmitted to the steering hydraulic pump 7, the loader hydraulic pump 8, the fan hydraulic pump 9, and the torque converter lubrication hydraulic pump 10.

When the steering hydraulic pump 7 is driven, the delivered pressurized oil is supplied to a steering hydraulic cylinder 13 through a steering control valve 11.

The steering hydraulic cylinder 13 is connected to a steering mechanism. When the pressurized oil is supplied to the steering hydraulic cylinder 13, the steering mechanism is operated, the vehicle body being turned. The spool of the steering control valve 11 is displaced according to the operation of a steering wheel (not shown), and according thereto, the opening area for the control valve 11 is changed, resulting in the flow rate for the fluid supplied to the steering hydraulic cylinder 13 being changed.

When the loader hydraulic pump 8 is driven, the delivered pressurized oil is supplied to the loader hydraulic cylinder 14 through the loader control valve 12.

The loader hydraulic cylinder 14 is connected to the loader in the front part of the vehicle body. When the pressurized oil is supplied to the loader hydraulic cylinder 14, the loader is operated. In other words, a boom constituting the loader is raised or lowered, a bucket being tilted. The spool of the steering control valve 12 is displaced according to the operation of a loader control lever (not shown), and according thereto, the opening area for the control valve 12 is changed, resulting in the flow rate for the fluid supplied to the loader hydraulic cylinder 14 being changed.

When the fan hydraulic pump 9 is driven, the delivered pressurized oil is supplied to a fan hydraulic motor 15, a cooling fan 16 being operated.

When a torque converter lubrication hydraulic pump 10 is driven, the delivered pressurized oil is supplied to the torque converter 2, the torque converter 2 being lubricated.

The output shaft for the engine 1 is provided with an engine revolutions detection sensor 1a for detecting the actual revolutions Nr of the engine 1. The engine revolutions Nr detected by the engine revolutions detection sensor 1a is inputted into the controller 18.

The input shaft of the torque converter 2 (the output shaft of the engine 1) is provided with a torque converter input shaft revolutions detection sensor 2a for detecting the revolutions N1 of the input shaft of the torque converter 2. The revolutions N1 detected by the torque converter input shaft revolutions detection sensor 2a is inputted into the controller 18.

The output shaft of the transmission 3 is provided with a transmission output shaft revolutions detection sensor 3a for detecting the revolutions N2 of the output shaft of the transmission 3. The revolutions N2 detected by the transmission output shaft revolutions detection sensor 3a is inputted into the controller 18.

An accelerator pedal 17 is operated by the operator, and the amount of operation (the amount of pedal depression) is detected by a stroke sensor 17a provided for the accelerator pedal 17, a signal indicating the amount of operation being inputted into the controller 18.

The drive wheels 5 are provided with a hydraulic brake for braking the drive wheels 5. A brake pedal 29 is operated by the operator, and the amount of operation (the amount of pedal depression) is detected by a stroke sensor 29a provided for a brake pedal 29, a signal indicating the amount of operation being inputted into the controller 18. The controller 18 controls the hydraulic brake such that the braking pressure according to the amount of pedal depression for the brake pedal 29 is provided.

The controller 18 controls the engine 1 such that the target revolutions according to the amount of operation for the accelerator pedal 17 are achieved.

A control panel 30 is provided with a power mode switch 31, a speed change mode switch 32, a forward/backward-drive switch 33, and a speed stage switch 34.

The speed change mode switch 32 is a switch for selecting the timing of automatic speed change for the transmission 3; the forward/backward-drive switch 33 is a switch for selecting the forward-drive hydraulic clutch or backward-drive hydraulic clutch in the transmission 3; and the speed stage switch 34 is a switch for selecting the speed stage clutch (the 1st-speed hydraulic clutch, the 2nd-speed hydraulic clutch, the 3rd-speed hydraulic clutch, or the 4th-speed hydraulic clutch).

The controller 18 controls the transmission 3 such that the speed stage is changed over at the speed change timing selected with the speed change mode switch 32. In addition, the controller 18 controls the transmission 3 such that automatic speed change is performed in the range of the speed stage selected with the speed stage switch 34 in the forward direction or the backward direction selected with the forward/backward-drive switch 33.

The power mode switch 31 is a switch for selecting the running state (power mode) in which the traveling load is high, and a high engine output is required for the running. When the "power mode" is not selected with the power mode switch 31 (when the switch is off), the running state (the normal mode) in which the traveling load is low and thus a high engine output is not required for the running is selected.

The engine 1 is a diesel engine, and the control of the output thereof is carried out by adjusting the amount of the fuel to be jetted into the cylinder. This adjustment is performed by controlling a governor additionally provided for the fuel jet pump for the engine 1. As the governor, a governor of all-speed control type is generally used, and it adjusts the engine revolutions and the amount of the fuel to be jetted according to the load such that the target revolutions according to the amount of pedal depression for the accelerator pedal is achieved. In other words, the governor increases or decreases the amount of the fuel to be jetted such that the difference between the target revolutions and the actual engine revolutions is eliminated. The output characteristic of the engine 1 is as shown in FIG. 2. The abscissa in FIG. 2 represents the engine revolutions N, while the ordinate the engine torque Te.

The region as defined by the maximum torque line $R_1$ in FIG. 2 expresses the performance which the engine 1 is capable of delivering. The governor controls the engine 1 such that the torque does not exceed the maximum torque line $R_1$, reaching the exhaust smoke limit, and such that the engine revolutions N does not exceed the high idle revolutions $N_H$, causing overturning.

FIRST EMBODIMENT

In the present embodiment, the variable displacement hydraulic pumps 7, 8, 9 are provided with absorption torque changing means for changing the absorption torque. With the controller 18, whether the traveling load is in the high state is determined, and when it has been determined that the traveling load is in the high state, the control for lowering the absorption torque for the variable displacement hydraulic pumps 7, 8, 9 is carried out. This control is carried out, provided that the "power mode" is selected with the power mode switch 31.

In FIG. 2, the torque converter matching curve $L_t$ provides the absorption torque line for the torque converter 2, representing the traveling load. As shown in the arrow A, as the accelerator pedal 17 is depressed, the engine revolutions N and the engine torque Te are raised, the torque converter absorption horsepower being raised.

The torque converter absorption horsepower is obtained by subtracting the pump absorption horsepower for the variable displacement hydraulic pumps 7, 8, 9 (further, including the torque converter lubrication hydraulic pump 10) from the engine output. When the working hydraulic pressure load is increased, the traveling load is decreased in relation thereto, the traction force and the acceleration being reduced.

When it has been determined that the traveling load is in the low state, the torque on the torque line $R_2$ as a result of subtracting the working hydraulic pressure load from the maximum torque line $R_1$ in the same FIG. 2 is used for the traveling load. The matching point for the torque converter absorption horsepower and the engine output is provided as the $V_2$ point on the torque line $R_2$.

When it has been determined that the traveling load is in the high state, the absorption torque for the variable displacement hydraulic pumps 7, 8, 9 is changed into a lower value. Thereby, the working hydraulic pressure load is decreased, the torque on the torque line $R_3$ as a result of subtracting the decreased working hydraulic pressure load from the maximum torque line $R_1$ in the same FIG. 2 is used for the traveling load. The matching point for the torque converter absorption horsepower and the engine output is provided as the $V_3$ point on the torque line $R_3$.

Thus, when it has been determined that the traveling load is in the high state, the matching point is moved from $V_2$ to the point $V_3$ where the torque converter absorption horsepower is great as compared to that when the traveling load is not in the high state, whereby, when a high load is imposed during the running while the working is being carried out, for example, when a large traction force is required, or an acceleration is needed at a slope, the traction force can be obtained, which allows the vehicle speed to be raised in a short period of time.

In other words, conventionally, as shown in FIG. 3, even when the traveling load is high, the engine output as shown with a shaded area in the same FIG. 3 is uniformly distributed to the working hydraulic pressure load in the same manner as when the traveling load is low, resulting in the engine output which can be used for the traveling load is low (the matching point is at $V_2$), thus, when a high load is imposed during the running while the working is being carried out, for example, when a large traction force is required, or an acceleration is needed at a slope, a sufficient traction force could not have been obtained, or even in a long period of time, the vehicle speed could not have been raised, however, according to the present embodiment, as shown in FIG. 2, when the traveling load is high, a lower engine output as shown with a shaded area in the same FIG. 2 is distributed to the working hydraulic pressure load, whereby the engine output which can be used for the traveling load is increased in relation thereto (the matching point is at $V_3$), thus when a high load is imposed during the running while the working is being carried out, for example, when a large traction force is required, or an acceleration is needed at a slope, a high traction force can be obtained, which allows the vehicle speed to be raised in a short period of time, as compared to the conventional art.

In the state in which the loader or the steering mechanism is not operated, in other words, in the state in which no working hydraulic pressure load is imposed, and the traveling load is high, the torque converter absorption horsepower matches with the engine output at the matching point $V_1$ on the maximum torque line $R_1$, and all the engine output can be used for the traveling load. Thus, when a large traction force is required, or acceleration is needed at a slope, a sufficient traction force can be obtained, which allows the vehicle speed to be raised in a short period of time.

Next, a specific example of scheme of means for changing the absorption torque for the hydraulic pump will be described.

FIG. 6 illustrates a scheme for PC controlling the loader hydraulic pump 8. In FIG. 6, the loader hydraulic pump 8 is taken as a representative, but when the other variable displacement hydraulic pumps 7, 9 are to be LC controlled, the same scheme can be employed.

The PC valve 19 controls the tilted angle of the tilting plate 7a for the hydraulic pump 8 such that the product of the delivery pressure $P_p$ (kg/cm$^2$) for the hydraulic pump 8 and the displacement q (cc/rev) for the hydraulic pump 8 does not exceed a certain torque. If the revolutions for the engine 1 is fixed, the tilted angle of the tilting plate 7a for the hydraulic pump 8 is controlled such that the product of the delivery pressure $P_p$ (kg/cm$^2$) for the hydraulic pump 8 and the flow rate Q (l/min) for the hydraulic pump 8 does not exceed a certain horsepower.

In addition, when the hydraulic pumps 7, 8, 9 are to be collectively PC controlled, the average amount of the delivery pressures for these pumps 7, 8, 9 is inputted into the PC valve 19.

The PC valve 19 controls the displacement q for the hydraulic pump 8 by inputting the delivery pressure $P_p$ for the hydraulic pump 8 as a pilot pressure, and supplying the driving pressurized oil according to the delivery pressure $P_p$ to the servo valve 20.

The content of the PC control can be explained with reference to FIG. 4. The abscissa in FIG. 4 expresses the delivery pressure $P_p$ (kg/cm$^2$) for the hydraulic pump 8, while the ordinate expresses the displacement q (cc/rev) for the hydraulic pump 8, in other words, the tilted angle of the tilting plate 8a.

As shown in the same FIG. 4, if the delivery pressure $P_p$ for the hydraulic pump 8 is not higher than a certain pressure, the tilted angle of the tilting plate 8a for the hydraulic pump 8 is set at a maximum, a maximum displacement $q_{max}$ being provided. When the working hydraulic pressure load is increased, and the pump delivery pressure $P_p$ exceeds the certain pressure, the pump displacement q is decreased in accordance with the characteristic LN1, with the tilted angle of the tilting plate being minimized for a minimum displacement $q_{min}$.

In the way as stated above, with the hydraulic pump 8, the pump displacement q is controlled according to the pump delivery pressure $P_p$ in the range in which the working hydraulic pressure load, in other words, the absorption torque does not exceed the maximum absorption torque $T_{p1}$.

To the PC valve 19, a control signal $i_1$ is applied from the controller 18, and according to this control signal $i_1$, the maximum absorption torque is changed.

Now, when it has been determined that the traveling load is in the low state, the maximum absorption torque for the hydraulic pump 8 is set at a greater value of $T_{p1}$, and the hydraulic pump 8 is controlled in accordance with the characteristic LN1. In addition, when it has been determined that the traveling load is the high state, the characteristic used is changed over from the characteristic LN1 to the characteristic LN2 as shown with the arrow D, the value of the pump delivery pressure at which the reduction in pump displacement is to be started being lowered, with the value of the maximum absorption torque being set at a small value of $T_{p2}$.

FIG. 7A illustrates a scheme for LS controlling the loader hydraulic pump 8. In FIG. 7A, the loader hydraulic pump 8 is taken as a representative, but when the other variable displacement hydraulic pumps 7, 9 are to be PC controlled, the same scheme can be employed.

The LS valve 22 controls the tilted angle of the tilting plate 8a for the hydraulic pump 8 such that the differential pressure ΔP between the delivery pressure $P_p$ for the hydraulic pump 8 and the load pressure $P_{LS}$ for the loader hydraulic cylinder 14 is a certain differential pressure of $\Delta P_{LS}$.

The LS valve 22 is provided with a spring for setting the certain differential pressure $\Delta P_{LS}$. To the pilot port for the LS valve 22 on the side opposite to the spring side, the delivery pressure $P_p$ for the hydraulic pump 8 is applied as a pilot pressure, while, to the pilot port on the spring side, the load pressure $P_{LS}$ for the loader hydraulic cylinder 14 is applied as a pilot pressure. By the driving pressurized oil being supplied from the LS valve 22 to the servo valve 20, the displacement q for the hydraulic pump 8 is controlled.

Assuming that the opening area for the loader control valve 12 is A, and the coefficient of drag is c, the delivered flow rate Q for the hydraulic pump 8 is expressed as $Q=c \cdot A \cdot \sqrt{(\Delta P)}$. Since the differential pressure $\Delta P$ is rendered constant by the LS valve 22, the pump flow rate Q is changed only by the opening area A of the spool for the control valve 12.

When the loader operation lever is operated, the opening area A of the loader control valve 12 is increased according to the amount of operation, and the pump flow rate Q is increased according to the increase in opening area A. At this time, the pump flow rate Q is determined only by the amount of operation of the loader operation lever, being not influenced by the working hydraulic pressure load. By thus providing the LS valve 22, the pump flow rate Q is not increased or decreased with the working hydraulic pressure load, but is changed as the operator's desires (according to the operating position of the loader operation lever), which improves the fine controllability, in other words, the operability in the intermediate operation region.

However, even in the region where the maximum flow rate for the hydraulic pump 8 is not exceeded, which is used in the fine control, or the like, the same rate of flow as required by the loader hydraulic cylinder 14 is always supplied, thus even when the engine 1 is in the low-speed region, the same rate of delivered flow as in the high-speed region is given.

Thus, with the controller 18, when the revolutions of the engine 1 is low, the control which lowers the differential pressure setting value $\Delta P_{LS}$ to decrease the delivered flow rate is carried out. The LS valve 22 is additionally provided with a differential pressure setting section 23 for changing the set spring force for the spring, and when the controller 18 outputs a control signal $i_2$ to the differential pressure setting section 23, the differential pressure setting section 23 changes the set spring force for the spring in the LS valve 22 to change the differential pressure setting value $\Delta P_{LS}$.

As shown in FIG. 7B, by applying the control signal $i_2$ to the solenoid in the LS valve 22, the set spring force for the spring in the LS valve 22 may be changed to alter the differential pressure setting value $\Delta P_{LS}$.

The content of such a differential pressure setting value change control can be described with reference to FIG. 5. The abscissa in FIG. 5 expresses the delivery pressure $P_p$ (kg/cm$^2$) for the hydraulic pump 8, while the ordinate expresses the displacement q (cc/rev) for the hydraulic pump 8, in other words, the tilted angle of the tilting plate 8a.

As shown in the same FIG. 5, when the delivery pressure $P_p$ for the hydraulic pump 8 is at a certain value of $P_{p1}$, and the pump displacement q is at a maximum value of $q_{max}$, changing the differential pressure setting value $\Delta P_{LS}$ into a smaller value corresponds to the right side of the above-mentioned equation ($Q=c \cdot A \cdot \sqrt{(\Delta P)}$) being decreased, whereby, as shown with the arrow E, the pump displacement q is changed from the maximum value $q_{max}$ to a lower value of $q_1$. With the pump displacement q being reduced, the absorption torque for the hydraulic pump 8, in other words, the working hydraulic pressure load is decreased.

When the controller 18 has determined that the traveling load is in the low state, it outputs a control signal $i_2$ to the LS valve 22 for setting the differential pressure setting value $\Delta P_{LS}$ at a larger value to increase the absorption torque for the hydraulic pump 8. In addition, when it has been determined that the traveling load is in the high state, a control signal $i_2$ for setting the differential pressure setting value $\Delta P_{LS}$ at a smaller value to decrease the absorption torque for the hydraulic pump 8 is outputted to the LS valve 22.

By combining the control for changing the maximum absorption torque for the hydraulic pump as illustrated in FIG. 4 with the control for changing the pump displacement for the hydraulic pump as illustrated in FIG. 5, the control which, when the working hydraulic pressure load is in the high state, lowers the absorption torque for the hydraulic pump may be carried out.

For all the variable displacement hydraulic pumps 7, 8, 9, the maximum absorption torque or the displacement may be decreased, or for one or two variable displacement hydraulic pumps of the variable displacement hydraulic pumps 7, 8, 9, the maximum absorption torque or the displacement may be reduced.

As described above, according to the present embodiment, when a high traveling load is imposed, a sufficient traction force is obtained, which allows the vehicle speed to be raised in a short period of time. Yet, the displacement for the fixed displacement hydraulic pump is not set at a uniform low value, but the displacement or the maximum absorption torque for the variable displacement hydraulic pump is only temporarily lowered when the traveling load is in the high state, thus degradation of the performance of the vehicle body is not caused. Yet, there is no need for rendering the engine large-sized in order to increase the engine output, which eliminates the problems of an increase in fuel consumption and waste of energy.

SECOND EMBODIMENT

In the first embodiment, when it has been determined that the traveling load is in the high state, the absorption torque for the hydraulic pump is decreased, and the torque converter absorption torque is increased in relation thereto, however, the determination that the traveling load is in the high state can be carried out by determining that the wheel loader 100 is in the accelerated state.

Specifically, it is determined by the controller 18 whether the acceleration of the vehicle body is a prescribed threshold value or over, and when the acceleration of the vehicle body has been determined to be the prescribed threshold value or over, the absorption torque for the hydraulic pumps 7, 8, 9 is decreased, and the torque converter absorption torque is increased in relation thereto. The acceleration of the vehicle body may be computed as the amount of change in revolutions per unit time that is detected by the engine revolutions detection sensor 1a, the torque converter input shaft revolutions sensor 2a, or the transmission output shaft revolutions sensor 3a, or may be obtained as the output of an acceleration sensor which is provided in the vehicle.

In addition, it is determined by the controller 18 whether the acceleration of the vehicle body is a prescribed threshold value or over, and whether the vehicle body is not in the deceleration state, and when it has been determined that the acceleration of the vehicle body is the prescribed threshold value or over, and that the vehicle body is not in the deceleration state, the absorption torque for the hydraulic pumps 7, 8, 9 may be reduced with the torque converter absorption torque being increased in relation thereto. Whether the vehicle body is not in the deceleration state may be determined by determining whether the brake pedal 29 has not been depressed, or whether the amount of pedal depression for the brake pedal 29 is a prescribed threshold value or under. In addition, by detecting the pressure of the oil for the hydraulic brake, and identifying that the hydraulic pressure is a prescribed threshold value or under, it may be determined that the vehicle body is not in the deceleration state.

In addition, it is determined by the controller 18 whether the amount of pedal depression is a prescribed threshold value or under for the accelerator pedal 17, and when the amount of pedal depression for the accelerator pedal 17 has been determined to be the prescribed threshold value or over, the absorption torque for the hydraulic pumps 7, 8, 9 may be decreased with the torque converter absorption torque being increased in relation thereto.

In addition, it is determined by the controller 18 whether the amount of pedal depression for the accelerator pedal 17 is a prescribed threshold value or over, and whether the vehicle body is not in the deceleration state, and when it has been determined that the amount of pedal depression for the accelerator pedal 17 is the prescribed threshold value or over, and that the vehicle body being not in the deceleration state, the absorption torque for the hydraulic pumps 7, 8, 9 may be decreased with the torque converter absorption torque being increased in relation thereto.

In addition, the difference between the target revolutions for the engine 1 and the actual engine revolutions Nr is computed, and whether this difference in revolutions is a prescribed threshold value or over is determined by the controller 18, and when it has been determined that the revolutions difference is the prescribed threshold value or over, the absorption torque for the hydraulic pumps 7, 8, 9 may be decreased with the torque converter absorption torque being increased in relation thereto.

In addition, the difference between the target revolutions for the engine 1 and the actual engine revolutions Nr is computed, and whether this difference in revolutions is a prescribed threshold value or over and whether the vehicle body is not in the deceleration state are determined by the controller 18, and when it has been determined that the revolutions difference is the prescribed threshold value or over, and that the vehicle body is not in the deceleration state, the absorption torque for the hydraulic pumps 7, 8, 9 may be decreased with the torque converter absorption torque being increased in relation thereto.

THIRD EMBODIMENT

In the first embodiment, when it has been determined that the traveling load is in the high state, the absorption torque for the hydraulic pump is decreased, and the torque converter absorption torque is increased in relation thereto, however, the determination that the traveling load is in the high state can be carried out by actually measuring the traveling load transmitted to the drive wheels 5, and determining that the measured traveling load is a prescribed threshold value or over.

Specifically, the traveling load is computed on the basis of the torque converter input shaft revolutions N1, the transmission output shaft revolutions N2, and the speed stage currently selected in the transmission 3, and whether this computed traveling load is a prescribed threshold value or over is determined by the controller 18, and when it has been determined that the computed traveling load is the prescribed threshold value or over, the absorption torque for the hydraulic pumps 7, 8, 9 may be decreased with the torque converter absorption torque being increased in relation thereto.

In addition, the traveling load is computed on the basis of the torque converter input shaft revolutions N1, the transmission output shaft revolutions N2, and the speed stage currently selected in the transmission 3, and whether this computed traveling load is a prescribed threshold value or over, and whether the vehicle body is not in the deceleration state are determined by the controller 18, and when it has been determined that the computed traveling load is the prescribed threshold value or over, and that the vehicle body is not in the deceleration state, the absorption torque for the hydraulic pumps 7, 8, 9 may be decreased with the torque converter absorption torque being increased in relation thereto.

The traveling load may be determined by computation as described above, or may be directly detected by mounting a stress gage, or the like, on the output shaft for the torque converter 2, the output shaft for the transmission 3, or the like.

FOURTH EMBODIMENT

In the above embodiments, the requirements for carrying out the control for decreasing the absorption torque for the hydraulic pumps 7, 8, 9 have been described, however, contrarily, whether the vehicle body is in the deceleration state is determined, and when it has been determined that the vehicle body is in the deceleration state, the control for decreasing the absorption torque for the hydraulic pumps 7, 8, 9 may be canceled. In other words, when it has been determined that the vehicle body is in the deceleration state, the control for lowering the maximum absorption torque for the hydraulic pump in the direction of the arrow D in FIG. 4 may be canceled, or the control for lowering the displacement for the hydraulic pump in the direction of the arrow E in FIG. 5 may be canceled for returning from the matching point $V_3$ in FIG. 2 where the working hydraulic pressure load is lower (the traveling load is higher), to the matching point $V_2$ where the working hydraulic pressure load is higher (the traveling load is lower).

FIFTH EMBODIMENT

In the first embodiment to the fourth embodiment as described above, it has been stated that the control for decreasing the absorption torque for the hydraulic pumps 7, 8, 9 is carried out, provided that the "power mode" is selected with the power mode switch 31. However, the system may be adapted such that, even when the "power mode" is not selected with the power mode switch 31 (even when the "normal mode" is selected), the absorption torque for the hydraulic pumps 7, 8, 9 may be decreased, if it has been determined that the traveling load is in the high state (if it has been determined that the vehicle body is in the acceleration state, or the measured traveling load is high).

SIXTH EMBODIMENT

In the second embodiment and the third embodiment as described above, the control which decreases the absorption torque for the hydraulic pumps 7, 8, 9 when the threshold value is exceeded is carried out, however, the magnitude of the threshold value may be changed according to the type of the running mode selected.

In this embodiment, in either of the cases when the "power mode" is selected, and when the "normal mode" is selected, the control for decreasing the absorption torque for the hydraulic pumps 7, 8, 9 is carried out. However, depending upon whether the "power mode" is selected or the "normal mode" is selected, the magnitude of the threshold value is changed. When the "power mode" is selected, the operator has an intention to run with a high traveling load, the threshold value is set at a low value. For example, by setting the threshold value of the amount of pedal depression for the accelerator pedal 17 at a low value, the control with which, even when the amount of pedal depression for the accelerator pedal is in the small state, the absorption torque for the hydraulic pumps 7, 8, 9 is immediately decreased with the torque converter absorption torque being increased in relation thereto is carried out. Thereby, any high traveling load can be early dealt with. Contrarily, when the "normal mode" is selected, the operator has no intention to run with so high a traveling load, thus the threshold value is set at a high value. For example, by setting the threshold value of the amount of pedal depression for the accelerator pedal 17 at a high value, the control with which, when the accelerator pedal is depressed in a large amount of pedal depression, the absorption torque for the hydraulic pumps 7, 8, 9 is decreased with the torque converter absorption torque being increased in relation thereto is carried out. Thereby, while priority is being given to the working hydraulic pressure load, the traveling load can also be dealt with.

SEVENTH EMBODIMENT

In the embodiments as described above, the control with which, only when it has been determined that the traveling load is in the high state (when it has been determined that the vehicle body is in the acceleration state or when it has been determined that the measured traveling load is high), the absorption torque for the hydraulic pumps 7, 8, 9 is decreased with the torque converter absorption torque being increased in relation thereto is carried out, however, such a determination itself may be omitted for carrying out the control with which, simply by performing the switch operation on the control panel 30, the absorption torque for the hydraulic pumps 7, 8, 9 is decreased.

In this embodiment, when the "power mode" is selected, the control which lowers the maximum absorption torque for the hydraulic pump in the direction of the arrow D in FIG. 4 is carried out, or the control which lowers the displacement for the hydraulic pump in the direction of the arrow E in FIG. 5 is carried out, for shifting to the matching point $V_3$ in FIG. 2 where the working hydraulic pressure load is lower (the traveling load is higher).

On the other hand, when the "normal mode" is selected, the control for lowering the maximum absorption torque for the hydraulic pump in the direction of the arrow D in FIG. 4 may be canceled, or the control for lowering the displacement for the hydraulic pump in the direction of the arrow E in FIG. 5 may be canceled for returning from the matching point $V_3$ in FIG. 2 where the working hydraulic pressure load is lower (the traveling load is higher), to the matching point $V_2$ where the working hydraulic pressure load is higher (the traveling load is lower).

The various determination techniques explained in the second embodiment and the third embodiment as described above may be combined as appropriate. For example, only when the two requirements, i.e., that the amount of pedal depression for the accelerator pedal 17 is a prescribed threshold value or over, and that the measured traveling load is a prescribed threshold value or over are met, the control for decreasing the absorption torque for the hydraulic pumps 7, 8, 9 may be carried out.

In addition, in the embodiments as described above, the application where the two types of running mode, i.e., the "power mode" and the "normal mode" are used has been explained, however, three or more types of running mode may be provided, with the content of the control and the magnitude of the threshold value being changed according to the respective types of running mode.

By the way, depending upon the type of the work vehicle, the output of the engine 1 is transmitted to the drive wheels 5 through the running hydraulic pump and the running hydraulic motor, rather than through the torque converter 2 and the transmission 3. To any work vehicle having such a configuration, the present invention can also be applied. In this case, the running hydraulic pressure load may be substituted for the "traveling load" in the respective embodiments for carrying out the control in the respective embodiments in the same way. In other words, the control which, when it has been determined that the running hydraulic pressure load is in the high state (that the vehicle body is in the acceleration state or that the measured running hydraulic pressure load is high), decreases the absorption torque (the working hydraulic pressure load) for the working hydraulic pumps 7, 8, 9, and increases the absorption torque (the running hydraulic pressure load) in relation thereto may be carried out.

INDUSTRIAL APPLICABILITY

The present invention is not limited to the application to wheel loaders, but can be applied to any work vehicles in the same way, provided that, with them, the engine output (the engine torque) is distributed to both the traveling load and the working hydraulic pressure load.

Figure 1:
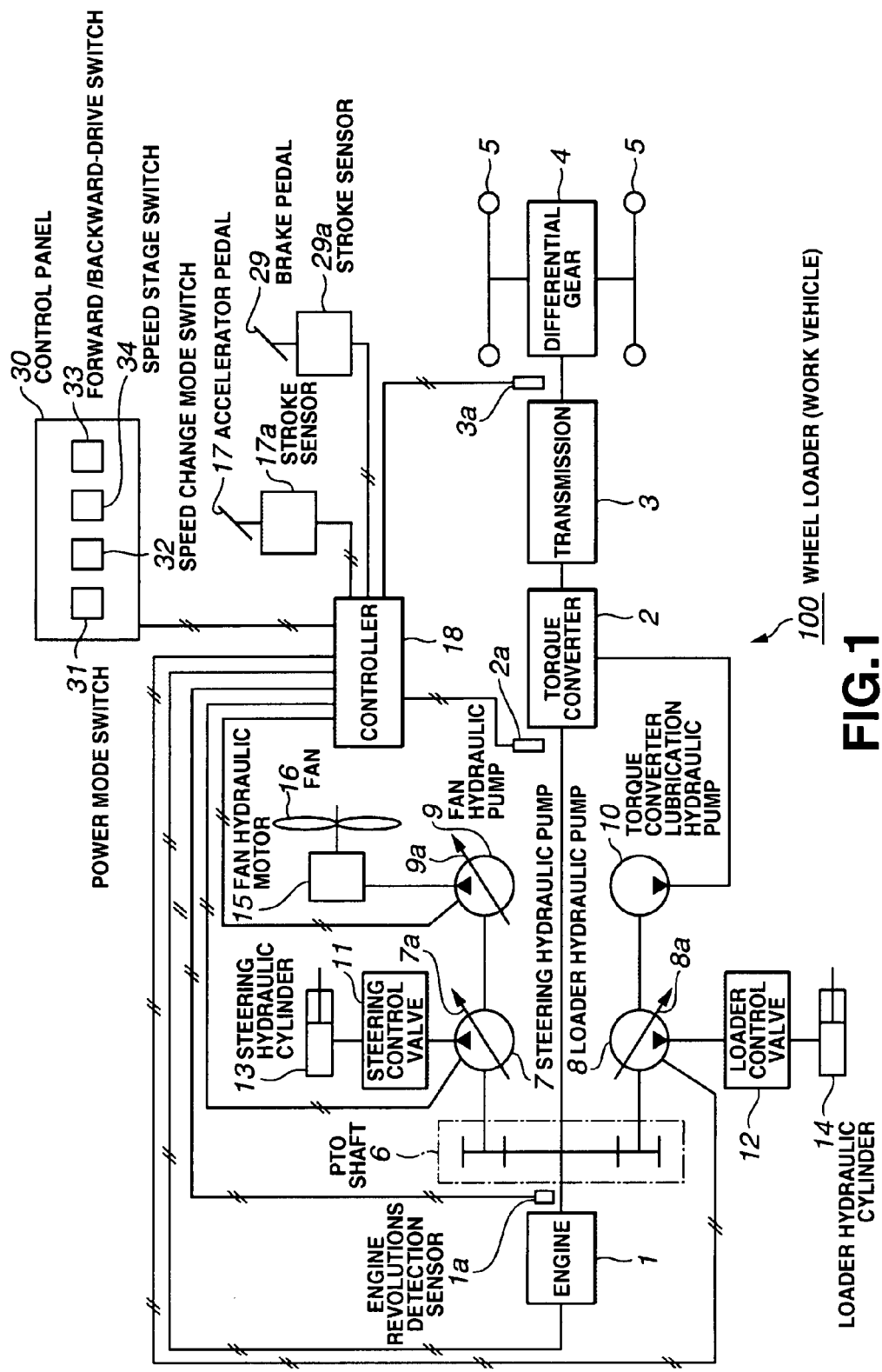
FIG. 1 is a diagram illustrating the configuration of the work vehicle of the embodiment.
Figure 2:
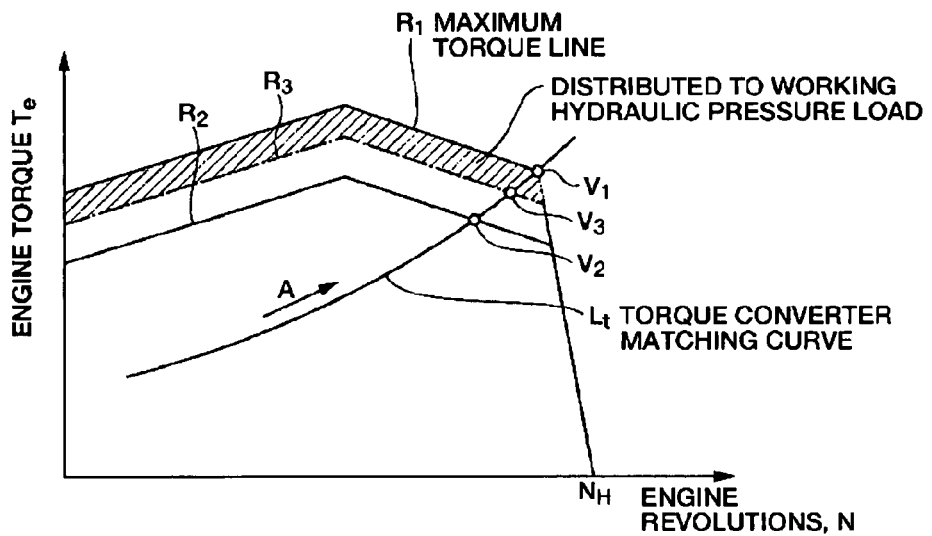
FIG. 2 is a diagram illustrating the relationship between the engine revolutions and the engine torque.
Figure 3:
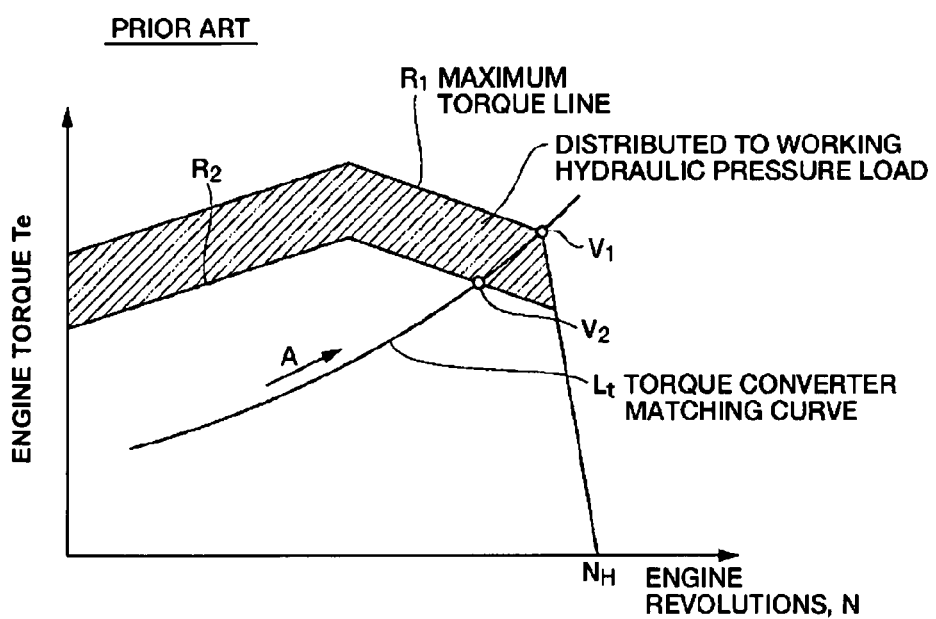
FIG. 3 is a diagram illustrating the conventional art that corresponds to FIG. 2.
Figure 4:
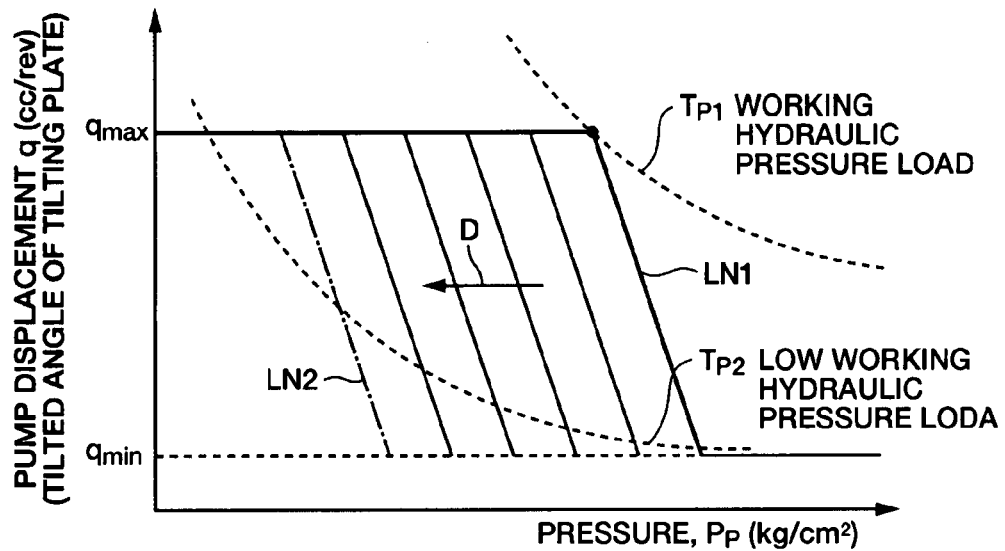
FIG. 4 is a diagram illustrating the control for changing the maximum absorption torque for the hydraulic pump.
Figure 5:
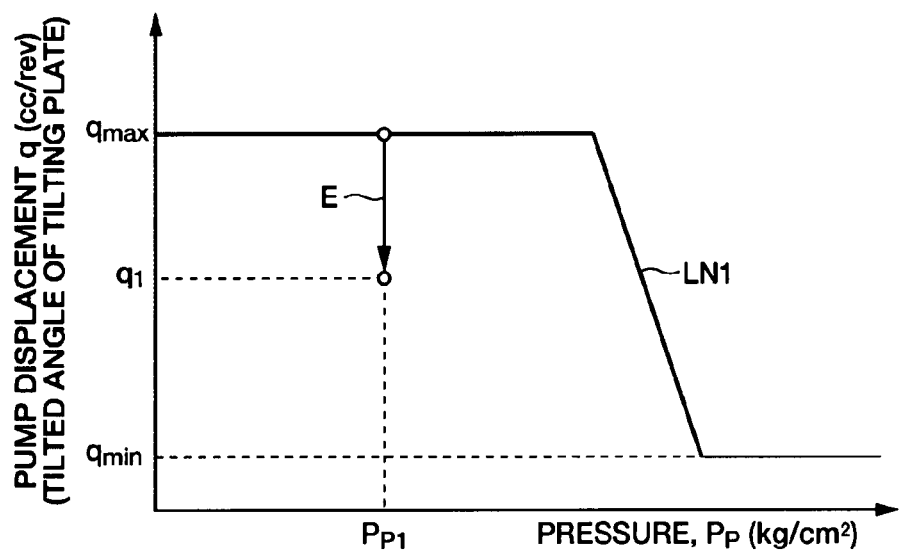
FIG. 5 is a diagram illustrating the control for changing the displacement for the hydraulic pump.
Figure 6:
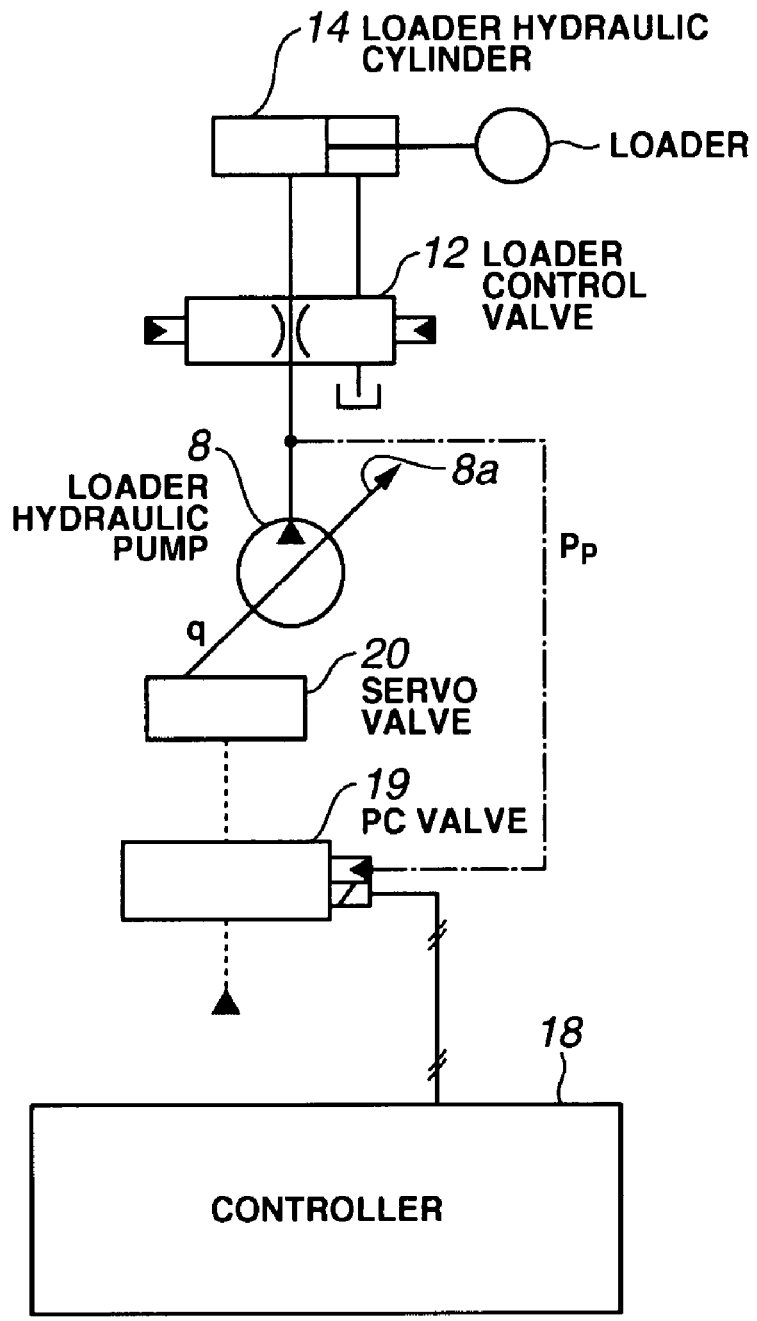
FIG. 6 is a diagram giving an example of scheme for carrying out the PC control.
Figure 7A:
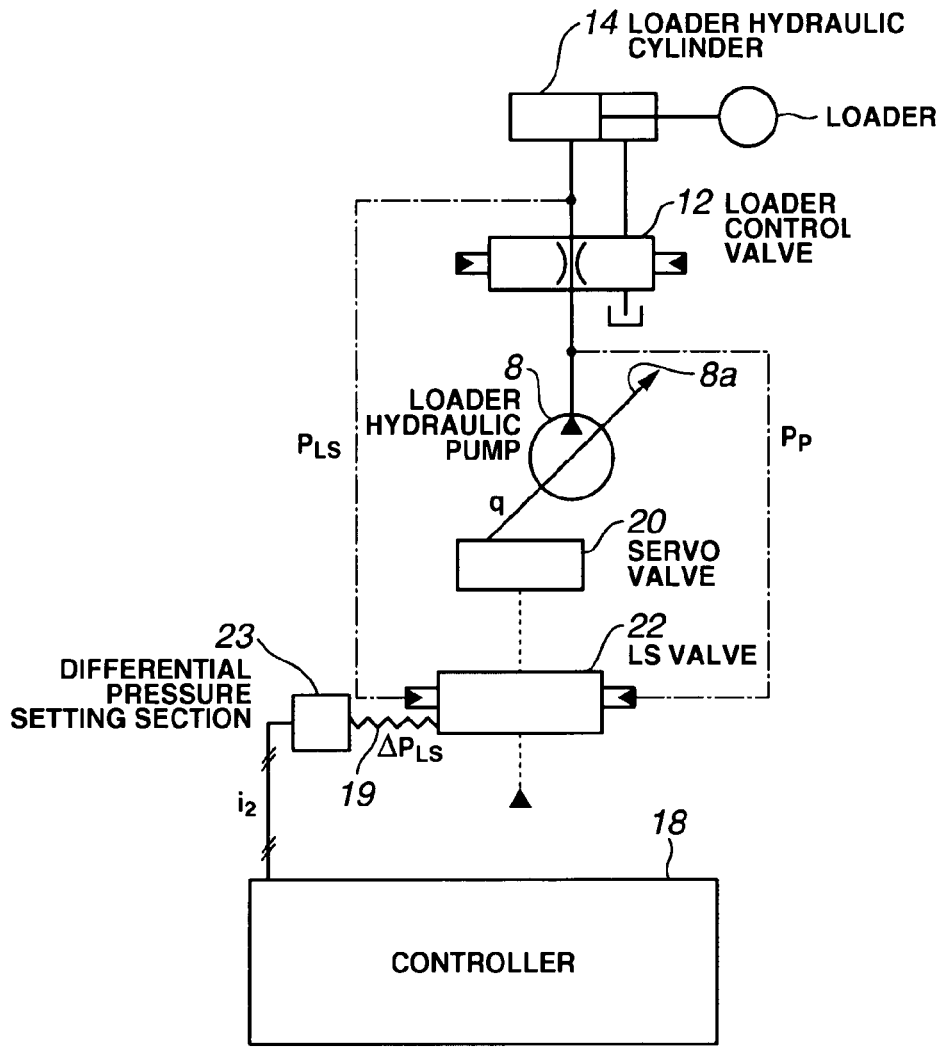
FIG. 7A and FIG. 7B are diagrams giving an example of scheme for carrying out the LS control.
Figure 7B:
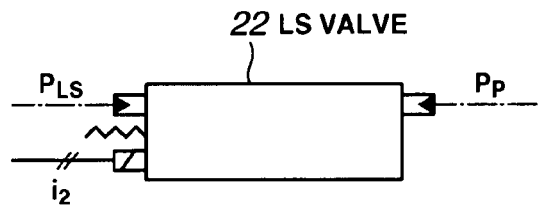

The invention claimed is:

1. A load control device for an engine of a work vehicle in which an output of the engine is transmitted to a drive wheel, and the output of the engine is transmitted to a work machine through a variable displacement hydraulic pump, comprising:

absorption torque changing means for changing absorption torque for the variable displacement hydraulic pump;

acceleration state determination means for determining whether the work vehicle is in an acceleration state, said acceleration state determination means having acceleration detection means for detecting acceleration of the work vehicle; and means for determining whether the acceleration of the work vehicle detected by the acceleration detection means is a threshold value or over wherein the threshold value is changed into a magnitude corresponding to a selected running mode in accordance with a type of running mode selected by a running mode selection means; and control means for, when it is determined by the acceleration state determination means that the work vehicle is in the acceleration state, lowering the absorption torque for the variable displacement hydraulic pump.

* * * * *